UNITED STATES PATENT OFFICE.

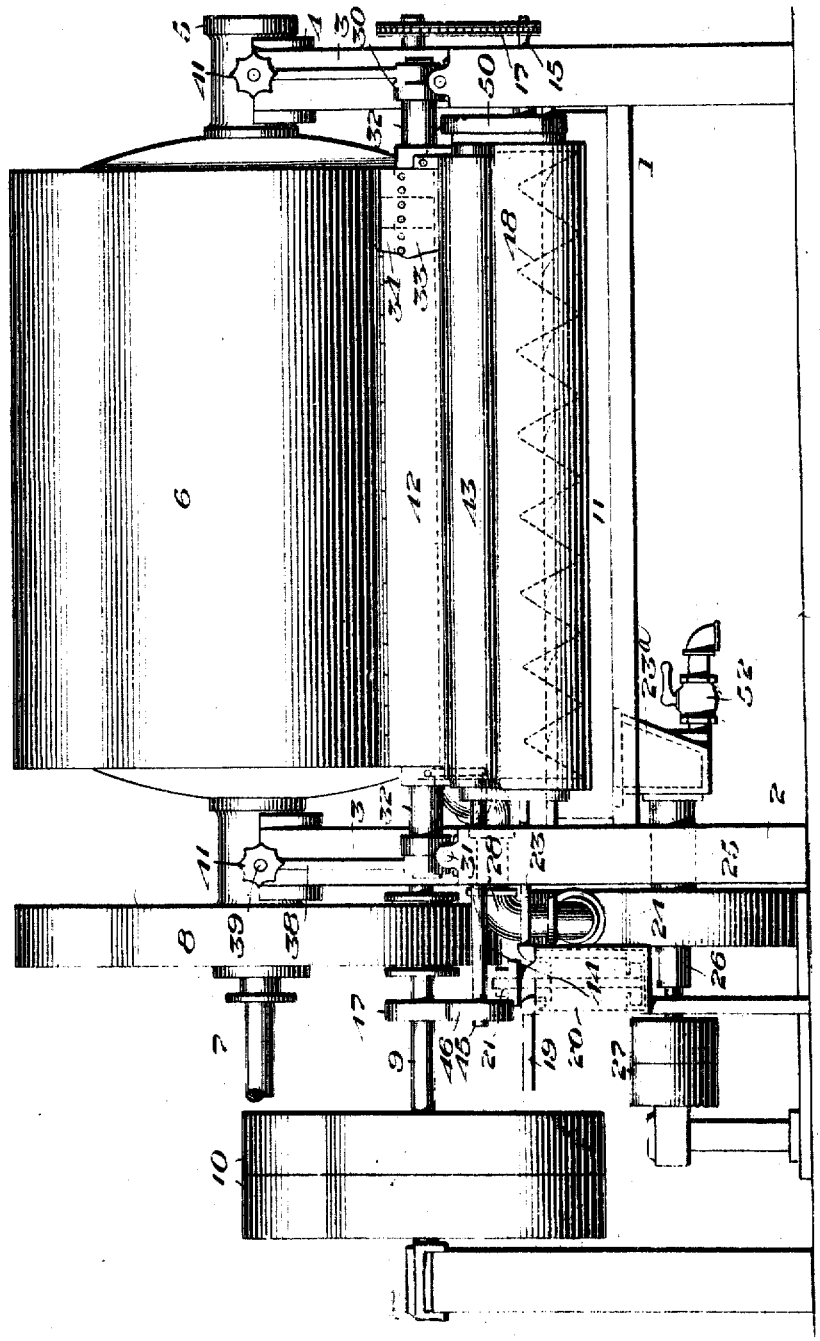

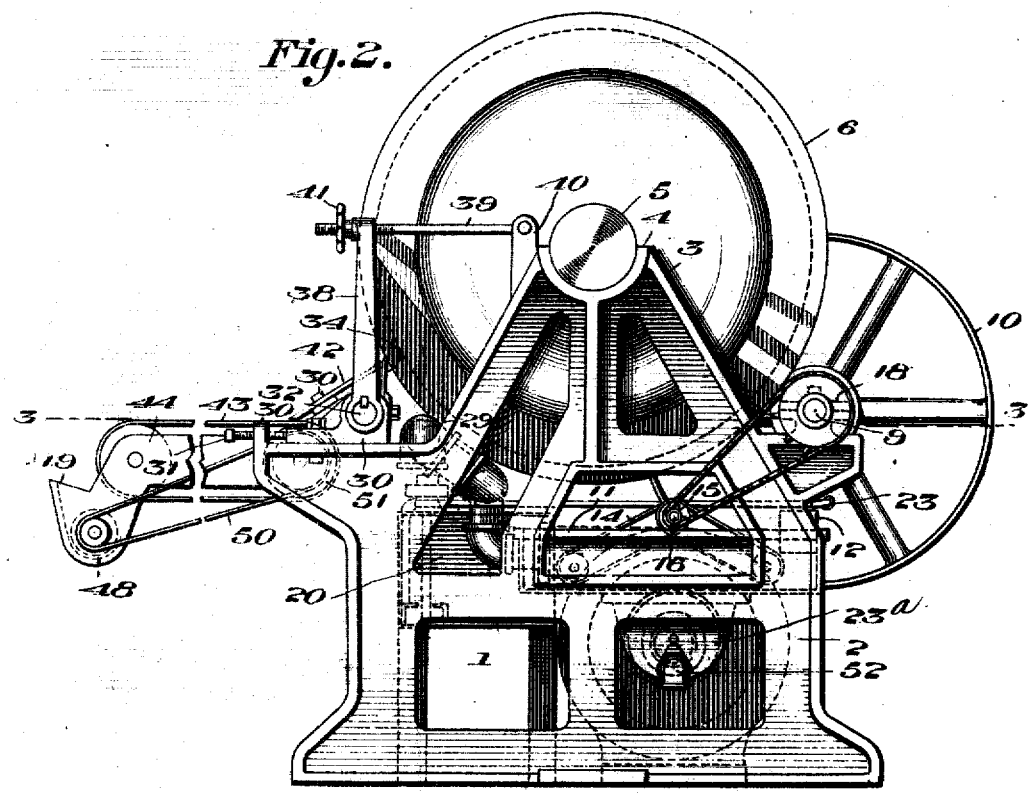
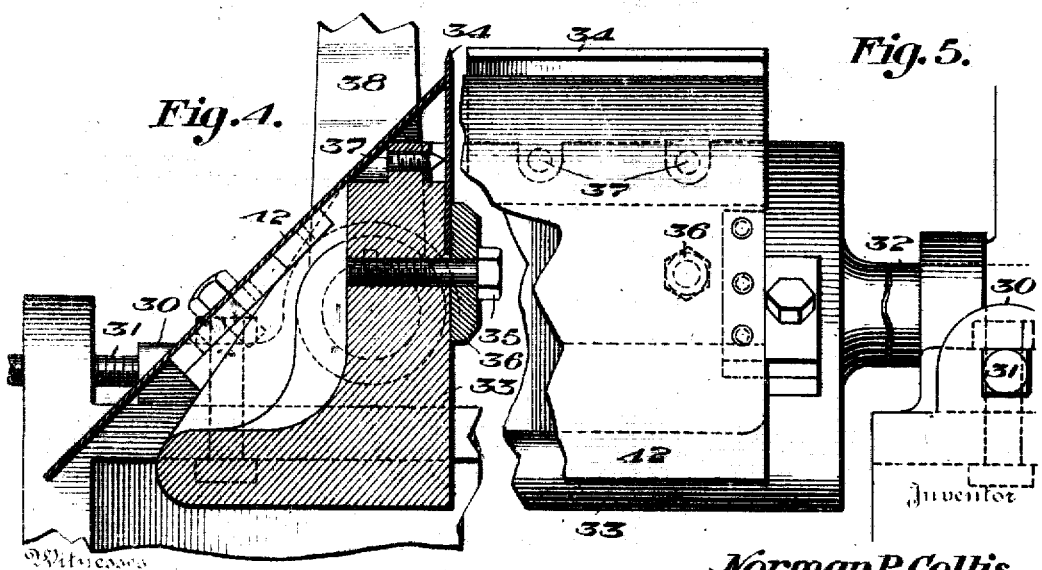

NORMAN P. COLLIS, OF DUBUQUE, IOWA, ASSIGNOR TO COLLIS PRODUCTS COMPANY, OF CLINTON, IOWA, A CORPORATION OF WEST VIRGINIA.

APPARATUS FOR DESICCATING LIQUIDS.

1,317,777.

Specification of Letters Patent.

Patented Oct. 7, 1919.

Application filed December 13, 1915. Serial No. 66,592.

*To all whom it may concern:*

Be it known that I, NORMAN P. COLLIS, a citizen of the United States, residing at Dubuque, in the county of Dubuque and State of Iowa, have invented certain new and useful Improvements in Apparatus for Desiccating Liquids, of which the following is a specification, reference being had therein to the accompanying drawing.

This invention relates to an apparatus for desiccating liquids, and it is especially applicable for use in the drying of buttermilk or sour milk.

The primary object of the invention is to effect the drying of buttermilk or sour milk in such manner that the resultant dry mass becomes a valuable constituent and well adapted to be mixed, while in the dry condition, with grain and other elements, to produce a poultry-ration having certain novel and important characteristics, or as an ingredient in the making of bread or other food products for human use.

Another object within the contemplation of the invention is to accomplish drying in such a way that the buttermilk or sour milk constituents lose none of their valuable qualities in being rendered into dry form.

In drying skim, whole or butter-milk, especially by the heated drum process, it has been, heretofore, difficult to retain many of the valuable food ingredients, as the more volatile liquid contents would separate from the mass and wash the more solid constituents from the drum. To obviate this difficulty, some coagulating substance was usually added, and portions of the volatile ingredients were drained off. By so doing the whey and consequently mineral salts, albumin and milk sugar which they contained were lost. These are valuable ingredients of the mass, especially in the preparation of poultry ration compounds and the like, and the present invention provides a method and means effecting desiccation whereby these ingredients are retained in the resultant dried product.

A secondary object is to provide a machine adapted to effect the drying in an effective manner and with a minimum loss of the bulk of liquid introduced to it.

The invention in general seeks to provide a drying-apparatus which is adapted to reduce buttermilk or sour milk to a dry condition, and which apparatus, from an operative standpoint, has in practical use been found to possess a high degree of efficiency and durability and which, structurally regarded, is of great simplicity.

Other objects and advantages will in part be obvious from the annexed drawings, or be explained in the following description.

The invention herein claimed resides broadly in the features of construction, in the construction of the various mechanisms and elements, and in the peculiar aggroupment of the parts, all as will be exemplified in the construction hereinafter set forth and the scope of application of which will be indicated in the claims hereto appended.

That the invention may be clearly comprehended, drawings illustrating what I have found to be a successful and practical embodiment and utilization of the same, are appended hereto as a part of this disclosure; it being manifest, however, that other possible utilizations and embodiments (employing the salient and underlying principle of my invention) fall within the spirit thereof, and within the objects contemplated thereby.

In these drawings:

Figure 1 is a view in front elevation of a machine constructed in accordance with one embodiment of my invention;

Fig. 2 is a view in end elevation thereof;

Fig. 4 is a fragmentary view in vertical transverse section, showing one of the scrapers, the juxtaposed take-off member, etc.; and, Fig. 5 is also a fragmentary view in front elevation of the same.

Figure 3:
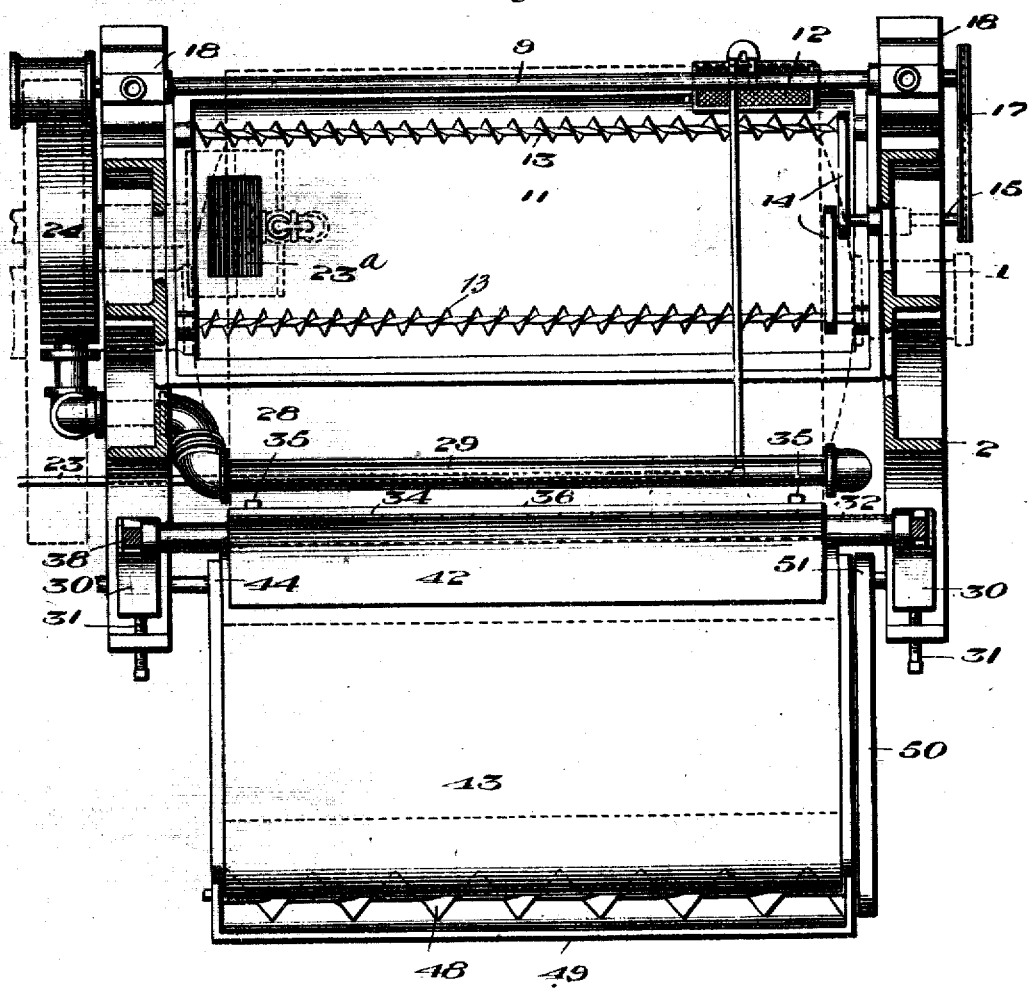
Fig. 3 is a view in horizontal section, on the line 3—3, Fig. 2.

Referring to the drawings, it will be noted that the reference-character 1 designates, generally, the frame of the machine, the same comprising, preferably and as shown, end portions 2 which are extended upwardly to provide drum-supporting standards 3. The upper portions of these standards are formed to constitute bearings 4 for a shaft 5 by which a drum 6 is sustained. The drum, in this instance, is hollow to permit the introduction thereinto, as by a pipe 7, of a heating-medium, such as steam.

The drum is, preferably and as shown, driven by means of a pulley 8 belted to a drive shaft 9 which in turn is driven by any suitable means, as by pulleys 10.

Underlying the drum is a receptacle 11 shown in this instance as an elongated tank, suitably mounted on the frame of the machine, and in communication with which there is a straining instrumentality 12.

In delivering a film of liquid to a drying drum considerable difficulty is encountered, especially if the liquid is buttermilk or sour milk, and to overcome this, heating in vacuo and the spray methods were developed. Both of these processes are complicated and expensive, and the present invention overcomes the difficulty by providing beaters or agitators for maintaining the mass in a finely mixed and homogeneous condition at different points in the system, through which the liquid must pass before being delivered to the drying drums. One embodiment of such means comprises agitators 13, placed in the tank 11, preferably longitudinally and journaled at their ends so as to be readily lifted therefrom for cleaning. In this instance, they are driven in opposite directions as by belts or chains 14 actuated from a drive shaft 15 conveniently placed for this purpose, and which is in turn in connection, as by a sprocket 16 and chain 17, with a driving member 18 mounted on shaft 9.

Means are provided for agitating and at the same time circulating the liquid before it is delivered to tank 11, and for this purpose a supply pipe 19 is led into an agitating instrumentality 20, in this instance containing a pump of the vertical type, and driven through suitable gearing 21, and driving connections, not shown. A delivery pipe 23 carries the liquid from the agitator through straining instrumentality 12, to the tank 11.

From the main tank 11, the liquid passes into a sub-tank 23ª in connection therewith, and from which it passes into a combined circulating and agitating instrumentality 24 connected with the sub-tank as by piping 25. In the present embodiment, the agitating instrumentality 24 is in the form of a pump driven through shaft 26 and pulleys 27 suitably connected with the drive shaft. The purpose of subjecting the liquid to a second pumping action is to augment its agitation so that, when presented to the heating drum, it will be in a frothy condition before being sprayed thereon.

From this agitator the liquid passes through pipes or the like 28 into a spray member 29 extended longitudinally across the drying drum. This may be a pipe with holes or a slot in it, or any suitable instrumentality which will deliver the liquid in a thin film to the drum.

After the liquid has undergone the various processes of agitation it is delivered to the drum through the spray pipe 29, where it is dried, and forms a thin flaky film thereon. For the purpose of removing this dried product there is arranged in juxtaposition to the drum and at a point just back of the spray pipe, an apparatus for this purpose.

It is preferably placed in proximity to the spray-pipe, so that the film of liquid when sprayed upon the drum will have traveled a complete revolution before being removed.

The instrumentality here shown for this purpose, and as best seen in Figs. 4 and 5, comprises brackets 30, slidably mounted on the frame, and adjusted to and away from the drum, bolts 31 being here shown for this purpose. Journaled in these brackets is a shaft 32, which carries a base 33, upon which there is disposed a series of scrapers 34 secured thereto, as by a clamping member 36 held by bolts 35. These scrapers are preferably beveled on both sides at the point where they make engagement with the drum, so as to be self-sharpening, and have individual adjustment, for which purpose, in the present embodiment, there are provided screws 37.

For adjusting the scrapers collectively, and as an entirety, a means is also provided. It comprises, in the present instance, arms 38 keyed to the ends of shaft 32, and provided at their free ends with loops or eyes through which the threaded end of links 39 pass. The opposite ends of these links are pivotally mounted in brackets 40 disposed on the frame, while adjusting screws 41 upon the threaded ends bear against the arms.

Upon the brackets 30, there is also disposed an instrumentality for taking off the dried products which have been removed by the scrapers. It comprises, in the present instance, a plate or take-off member 42 secured to the brackets, and one end of which is pressed against the scrapers, the other end extending out in a slanting direction to convey the dried material from the drum to a suitable drying, aerating, conveying, and disintegrating instrumentality which will now be described.

A belt 43 passes over rollers journaled in bracket arms 44, suitably mounted on the frame, and one of which rollers is in driving connection with shaft 9 through a shaft 45 which carries on one end a pulley 46 that is connected as by belting with a pulley 47 mounted on shaft 9.

The outer ends of arms 44 are extended to form a journal for a disintegrator, crusher and conveyer 48 placed in a trough 49 secured to the extended portions of the arms. The material, when scraped from the drum, travels down the inclined take-off 42 on to the belt 43. During this travel it is broken up to a certain extent, and while traveling over the belt is further dried and aerated. From here it is passed into the trough 49, broken up into the desired amount of fineness and forced to the end of the trough where it may be gathered into suitable receptacles. The disintegrator is driven in any convenient manner, as by belting or the like 50 in driving connection with a pulley 51 mounted on the shaft of one of the rollers.

The course of travel of the liquid, in circulating through the apparatus, is as follows: It is introduced from a suitable source of supply through the pipe 19 into the pump 20 by which it is forced through the pipe 23 (Fig. 3) to the strainer 12. From this it passes into the agitating tank 11 from which it is discharged into the sub-tank 23ª. From the latter, it passes into the pump 24 by which it is forced through the pipe 28 into the spray-pipe 29 by which it is sprayed on to the drum 6.

For the purpose of draining the entire system there is provided a pet cock 52, which in the present instance is secured to the sub-tank 23ª.

From the foregoing it will be apparent that the present invention provides a machine for desiccating liquids, particularly buttermilk and sour milk, which has few parts, conveniently arranged, and which avoids the principal features which proved objectionable in the former methods of performing its functions.

By arranging agitating instrumentalities at various points in the circulating system, and by the particular manner in which the liquid is finally sprayed upon the drum, the film of liquid is disposed thereon in a frothy condition which reduces the insoluble particles to finely divided condition and aids materially in driving off the more volatile liquid particles and at the same time retaining in the residue not only the insoluble particles but also portions of the liquid contents which by previous methods were frequently lost.

While the invention has been disclosed in the embodiment here presented, it will be understood that it is not to be limited to the precise form of its disclosure nor to any particular manner whereby the same may have been carried into effect, as many changes may be made in the construction and arrangement of the parts without departing from the spirit of the invention or sacrificing its chief advantages.

What I claim is:

1. An apparatus for effecting desiccation of milk, buttermilk, and the like, including in combination a frame; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum; a take-off member having a portion arranged in juxtaposition to the scraping mechanism; a conveyer having a movement in proximity to another portion of the member; and a trough into which the conveyer delivers the mass of dried milk.

2. An apparatus for effecting desiccation of milk, buttermilk, and the like, including in combination a frame; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum; a take-off member having a portion arranged in juxtaposition to the scraping mechanism; a conveyer having a movement in proximity to another portion of the member; a trough into which the conveyer delivers the mass of dried milk; and a disintegrating device working in the trough.

3. An apparatus for effecting desiccation of milk, buttermilk, and the like, including in combination a frame; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum; a take-off member having a portion arranged in juxtaposition to the scraping mechanism; a conveyer having a movement in proximity to another portion of the member; a trough into which the conveyer delivers the mass of dried milk; and a disintegrating device working in the trough.

4. An apparatus for effecting desiccation of milk, buttermilk, and the like, including in combination a frame; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum; an inclined take-off member having a portion arranged in juxtaposition to the scraping mechanism; a conveyer having a movement in proximity to another portion of the member; a trough into which the conveyer delivers the mass of dried milk; and a disintegrating device working in the trough.

5. An apparatus for effecting desiccation of milk, buttermilk, and the like, including in combination a frame; an agitation-receptacle supported thereby; a pair of spaced apart agitators operating in the receptacle; a drying drum mounted on the frame; a spraying device juxtaposed to the drum; means for transferring the milk from the receptacle to the spraying device; scraping mechanism having a normal scraping engagement with the drum; an inclined take-off member having a portion arranged in juxtaposition to the scraping mechanism; a conveyer having a movement in proximity to another portion of the member; a trough into which the conveyer delivers the mass of dried milk; and a disintegrating device working in the trough.

6. An apparatus for effecting desiccation of milk, buttermilk, and the like, including in combination a frame; an agitation-receptacl supported thereby; a pair of spaced-apart, oppositely disposed agitators operating in the receptacle; a driving drum mounted on the frame; a spraying device juxtaposed to the drum; means for transferring the milk from the receptacle to the spraying device; scraping mechanism having a normal scraping engagement with the drum; an inclined take-off member having a portion arranged in juxtaposition to the scraping mechanism; a conveyer having a movement in proximity to another portion of the member; a trough into which the conveyer delivers the mass of dried milk; and a disintegrating device working in the trough.

7. An apparatus for effecting desiccation of milk, buttermilk, and the like, including in combination a frame; an agitation-receptacle supported thereby; a pair of spaced apart, oppositely disposed agitators operating in the receptacle; a drying drum mounted on the frame; a spraying device juxtaposed to the drum; means for transferring the milk from the receptacle to the spraying device; including a milk-pumping device; scraping mechanism having a normal scraping engagement with the drum; an inclined take-off member having a portion arranged in juxtaposition to the scraping mechanism; a conveyer having a movement in proximity to another portion of the member; a trough into which the conveyer delivers the mass of dried milk; and a disintegrating device working in the trough.

8. An apparatus for effecting desiccation of milk, buttermilk, and the like, including in combination a frame; an agitation-receptacle supported thereby; an auxiliary milk-receptacle feeding into the agitation-receptacle; a pair of spaced-apart, oppositely disposed agitators operating in the receptacle; a drying drum mounted on the frame; a spraying device juxtaposed to the drum; means for transferring the milk from the receptacle to the spraying device; including a milk-pumping device; scraping mechanism having a normal scraping engagement with the drum; an inclined take-off member having a portion arranged in juxtaposition to the scraping mechanism; a conveyer having a movement in proximity to another portion of the member; a trough into which the conveyer delivers the mass of dried milk; and a disintegrating device working in the trough.

9. An apparatus for effecting desiccation of milk, buttermilk, and the like, including in combination a frame; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum and including a series of alined scrapers; a take-off member having a portion arranged in juxtaposition to the scraping mechanism; a conveyer having a movement in proximity to another portion of the member; and a trough into which the conveyer delivers the mass of dried milk.

10. An apparatus for effecting desiccation of milk, buttermilk, and the like, including in combination a frame; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum and including a series of alined scrapers disposed in vertical arrangement and parallel with the axis of rotation of the drum; a take-off member having a portion arranged in juxtaposition to the scraping mechanism; a conveyer having a movement in proximity to another portion of the member; and a trough into which the conveyer delivers the mass of dried milk.

11. An apparatus for effecting desiccation of milk, buttermilk, and the like, including in combination a frame; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum and including a series of alined scrapers disposed in vertical arrangement and parallel with the axis of rotation of the drum; individual scraper-adjusting devices for positioning the effective portions of the scrapers in relation to the surface of the drum; a take-off member having a portion arranged in juxtaposition to the scraping mechanism; a conveyer having a movement in proximity to another portion of the member; and a trough into which the conveyer delivers the mass of dried milk.

12. An apparatus for effecting desiccation of milk, buttermilk, and the like, including in combination a frame; an agitation-receptacle supported thereby; agitating mechanism disposed in the receptacle; a spraying device juxtaposed to the drum; means for transferring the milk from the receptacle to the spraying device; scraping mechanism having a normal scraping engagement with the drum; a take-off member having a portion arranged in juxtaposition to the scraping mechanism; a conveyer having a movement in proximity to another portion of the member; a trough into which the conveyer delivers the mass of dried milk; a disintegrating device working in the trough; a main drive adapted to rotate the drum, and driving means for the agitating mechanism deriving motion from the main drum.

13. An apparatus for effecting desiccation of milk, buttermilk, and the like, including in combination a frame comprising upstanding drum-supporting trunnions; an agitation-receptacle supported thereby; an agitating mechanism disposed in the receptacle; a drying drum mounted on the frame; a spraying device juxtaposed to the drum; means for transferring the milk from the receptacle to the spraying device; scraping mechanism having a normal scraping engagement with the drum; a take-off member having a portion arranged in juxtaposition to the scraping mechanism; a conveyer having a movement in proximity to another portion of the member; and a trough into which the conveyer delivers the mass of dried milk.

14. An apparatus for effecting desiccation of milk, buttermilk, and the like, including in combination a frame comprising upstanding drum-supporting trunnions; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum; a take-off member having a portion arranged in juxtaposition to the scraping mechanism; a conveyer having a movement in proximity to another portion of the member; and a trough into which the conveyer delivers the mass of dried milk.

15. An apparatus for effecting desiccation of milk, buttermilk, and the like, including in combination a frame; an agitation-receptacle supported thereby; agitating mechanism disposed in the receptacle; a drying drum mounted on the frame; a spraying device juxtaposed to the drum; means for transferring the milk from the receptacle to the spraying device; scraping mechanism having a normal scraping engagement with the drum and including a series of alined scrapers disposed in vertical arrangement and parallel with the axis of rotation of the drum; a take-off member having a portion arranged in juxtaposition to the scraping mechanism and including an elongated plate common to and arranged in angular relation to the scrapers and contacting therewith; a conveyer having a movement in proximity to another portion of the member; and a trough into which the conveyer delivers the mass of dried milk.

16. A liquid desiccating apparatus including in combination, a drying member; a liquid storage receptacle; an agitating instrumentality disposed in said receptacle; a circulating system for supplying liquid to said receptacle; an agitating instrumentality included in said circulating system; means for delivering liquid from said receptacle to said drying member; and means for removing dried residue from the drum.

17. A liquid desiccating apparatus including in combination a drying member; a liquid receptacle; an agitating instrumentality disposed in said receptacle; a circulating system for supplying liquid to said receptacle; an agitating instrumentality included in said circulating system; a circulating system for carrying liquid from said receptacle to said drying member; an agitating instrumentality included in said circulating system; and means for removing dried residue from the drum.

18. A liquid desiccating apparatus including in combination a drying member; a liquid storage receptacle; a screening instrumentality disposed thereon; an agitating instrumentality in said receptacle; a liquid supply pipe; an agitating instrumentality connected with said supply; means for delivering liquid to said receptacle, said means being connected with said agitating means; a second receptacle in communication with said liquid storage receptacle; an agitating and circulating instrumentality in communication with said second receptacle; a spraying instrumentality disposed in proximity to said drying member; means for delivering liquid from said circulating and agitating instrumentality to said spraying instrumentality; and means for removing dried residue from the drum.

19. A liquid desiccating apparatus including in combination a drying member; a liquid storage receptacle; a screening instrumentality disposed thereon; an agitating instrumentality in said receptacle; a liquid supply pipe; an agitating instrumentality connected with said supply; means for delivering liquid to said receptacle, said means being connected with said agitating means; a second receptacle in communication with said liquid storage receptacle; an agitating and circulating instrumentality in communication with said second receptacle; a spraying instrumentality disposed in proximity to said drying member; means for delivering liquid from said circulating and agitating instrumentality to said spraying instrumentality; and means comprising a series of scrapers adjustably mounted in proximity to said drum for removing the dried residue therefrom.

In testimony whereof I affix my signature in presence of two witnesses.

NORMAN P. COLLIS.

Witnesses:
 FRIEDA E. TRITSCHLER,
 ANNA C. BLAAS.